Jan. 15, 1957  S. R. DICKEY  2,777,380
PRECISION LAWN EDGER
Filed May 28, 1953
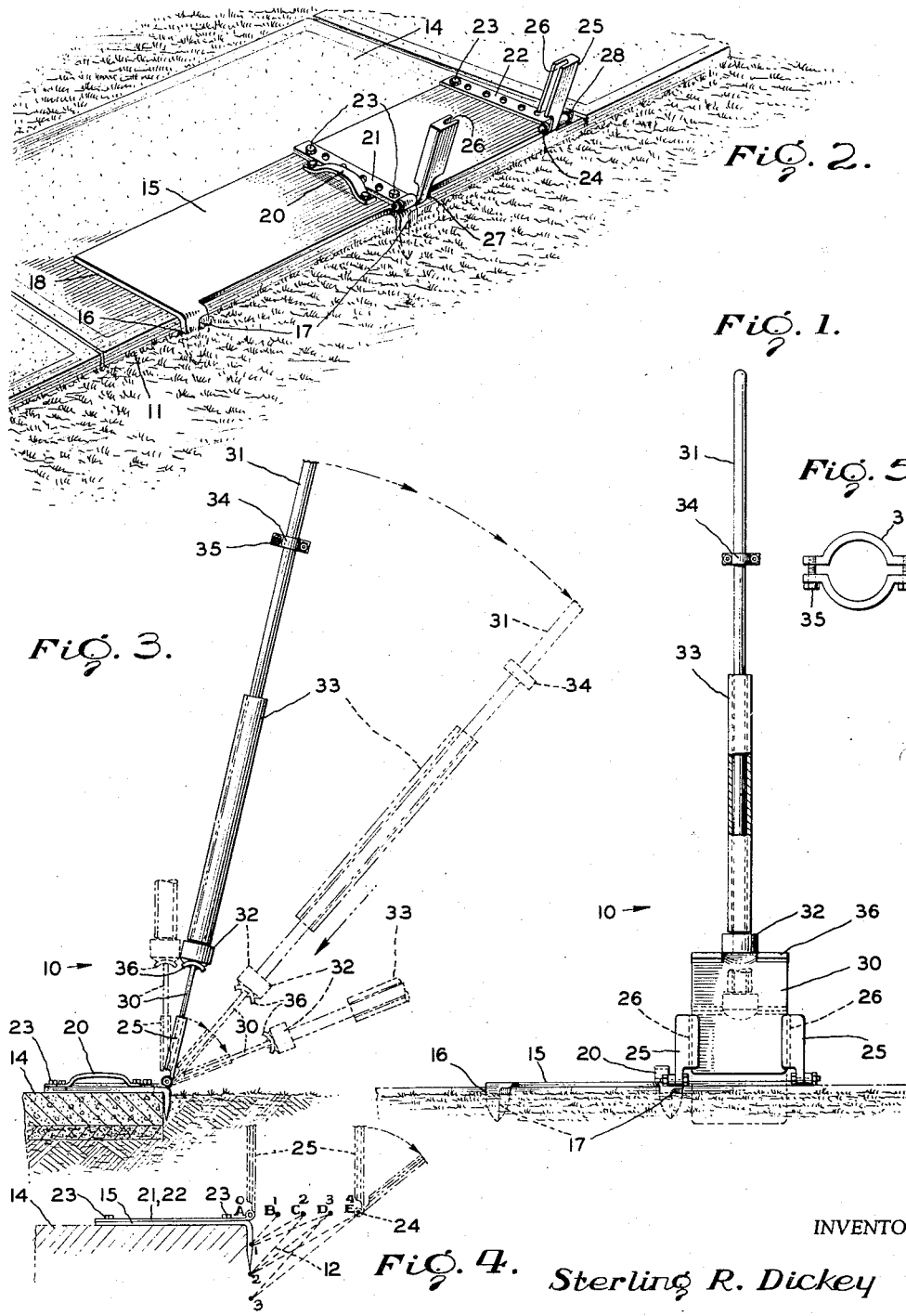
INVENTOR
Sterling R. Dickey
BY Gustav Miller
ATTORNEY

United States Patent Office 2,777,380
Patented Jan. 15, 1957

2,777,380
PRECISION LAWN EDGER

Sterling R. Dickey, Ephrata, Wash., assignor to Gustave Miller, Washington, D. C.

Application May 28, 1953, Serial No. 357,972

6 Claims. (Cl. 97—227)

This invention relates to a precision lawn edger for trimming a lawn edge at a precise angle to a sidewalk or other element adjacent the lawn edge.

It is an object of this invention to provide a precision lawn edger for manually cutting the edge of a lawn at a desired precise angle to an adjacent sidewalk with a minimum of manual exertion, and for maintaining the precise desired angle throughout the extent of the cutting operation, advancing the edger along the guiding edge of the sidewalk by means of one's toe without the necessity of stooping, and pushing the cutting blade into the lawn at the desired precise angle by successive hammer impulses, and then withdrawing it on completion of the cutting operation, likewise by hammer impulses.

A further object of this invention is to provide a pair of blade guiding grooved brackets which may be adjusted at a desired angle to the base and at a corresponding appropriate distance therefrom, with the base having means for guiding it along the edge of the sidewalk, whereby the lawn may be cut either vertically along the edge of the sidewalk, or at a desired angle and distance therefrom, so as to provide a V-groove between the edge of the lawn and the edge of the sidewalk, the cut edge of the lawn providing one side of the V-groove, and the edge of the sidewalk providing the other side of the V-groove.

Briefly, this invention includes a base plate which may be laid on the sidewalk with guiding fingers extending along the edge of the sidewalk from an end and an intermediate point of said base, and having a pair of spaced apart adjustable and hinged brackets which may be secured to the base forwardly of the guiding fingers, so that the blade guiding grooves will extend vertically or at a desired angle and at a corresponding appropriate distance from the edge of the base, and also, a lawn edging blade guided in said grooves having a handle and an anvil abutment thereon with a sleeve hammer for driving the blade into the lawn and an adjustable anvil above the hammer to be set at a desired point thereon to receive impulses from the hammer when necessary in withdrawing the blade at the completion of the cutting operation.

In addition, there is a toe receiving lift on the base, so that when one cutting operation is completed, and the blade is withdrawn, the base and the entire implement may be advanced by pushing one's toe thereagainst, the guiding fingers sliding in the newly formed groove, and advancing the cutting blade to an uncut portion of the lawn immediately adjacent the already cut portion of the lawn.

With the foregoing and other objects in view, this invention comprises the combination, construction and arrangement of parts hereinafter set forth, claimed and disclosed in the accompanying drawings, wherein:

Fig. 1 is a front elevational view showing the cutting blade in the grooved bracket ready for use.

Fig. 2 is a perspective view of the base and grooved guiding brackets in position on a sidewalk adjacent a lawn edge, the edging blade being omitted therefrom.

Fig. 3 is a side elevational view of the invention showing several possible angular positions of the cutting blade.

Fig. 4 is a partly diagrammatic view showing various distance adjustments of the angle brackets on the base.

Fig. 5 is a plan view of the upper anvil abutment.

There is shown at 10 the precision lawn edger of this invention for trimming a lawn edge 11 at a desired precise angle 12 relative to a sidewalk 14 along which the lawn may extend.

It will be understood that the term sidewalk includes a curbing, a roadway, or any other element adjacent a lawn.

The lawn edger 11 includes a flat base 15 arranged to rest on the sidewalk and provided with a pair of spaced apart guide teeth 16, which are bevelled on their forward sides as at 17, one tooth 16 being located adjacent the rear edge 18 of the base 15, and the other tooth 16 being located slightly forward of an intermediate point of the same side edge of the base 15.

A toe receiving clip 20 is riveted or otherwise secured to the top of the base 15 adjacent this intermediate point. Secured to the top of the base plate 15 are a pair of spaced apart brackets 21 and 22, the bracket 22 being secured adjacent the forward end of the base plate 15, and the bracket 21 being secured adjacent the intermediate guide tooth.

Each bracket 21 and 22 is adjustably secured across the top of the base plate 15 by means of several cap screws 23 extending through drilled holes on one inch centers in the bracket and correspondingly located tapped or threaded holes in the base plate 15. Each bracket 21 and 22 is provided with a hinged cooperating means at the operating edge thereof, which may consist of a horizontally extending eye 24. Hingedly secured to each of these eye means 24 is a grooved bracket or slotted arm 25 having opposed blade guiding slots or grooves 26, the arms or brackets 25 having cooperating hinged eyes 27 through which may be secured bolts and nuts 28 for adjustably hinging and fastening the arms or brackets 25 at the desired angle to the base brackets 21 and 22, as shown in Figs. 3 and 4.

Reciprocally guided in these opposed slots or grooves 26 is a lawn edge cutting blade 30 on which is mounted a handle 31 having an anvil abutment 32 adjacent the blade end of the handle. A sleeve hammer 33 is mounted about the handle 31 and a second anvil abutment 34 is adjustably secured thereon by means of set screws 35 at any desired upper portion of the handle member 31 after the hammer 33 has been put in position.

In operation, the base plate 15 will be placed on the sidewalk 14 with its guide teeth 16 extending along the edge of the sidewalk 14. Bracket members 21 and 22 are adjustably secured to the base plate 15 so that their hinged ends 24 are either close to the operating edge of base 15 or at a desired distance therefrom, as shown in Fig. 4, according to the angle at which it will be desired to cut the groove along the lawn edge 11. The hinge bolts 28 are then tightened with the leg guiding brackets or arms 25 at the desired angle.

Next, the blade 30 is guided in the grooves or slots 26 with the cutting edge in contact with the lawn, and the hammer 33 is manually lifted and then dropped or projected downwardly causing the cutting edge of blade 30 to cut into the lawn to the desired depth, either vertically or at whatever angle has been selected. When the groove has been cut to the desired depth, the blade is withdrawn, hammering the hammer 33 against the upper anvil 34, if necessary, should the blade be stuck in the ground. Then, the cut material is removed as by a separate spade, if necessary, or even by means of the cutting blade 30, the upper edge 36 thereof providing a foot receiving pressure edge.

Then, by inserting one's toe under or against the toe lift 20, the base plate 15 may be advanced along the newly cut groove with the bevelled sides 17 of the guide teeth 16 guiding the blade along until the forward tooth 16 abuts the forward end of the newly cut groove, whereupon the blade may be reciprocated to repeat the operation, thus advancing the entire device between successive groove cutting operations to thus cut the entire lawn edge at the same desired angle.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A precision lawn edger for trimming a lawn edge at a desired precise angle to a sidewalk or other element adjacent the lawn edge comprising a base to be supported on the sidewalk or other element, a pair of spaced apart guide teeth extending downwardly from an edge of said base along the sidewalk edge, one of said teeth being at the rear end of said base and the other of said guide teeth being slightly forward of the midpoint of said edge of said base, a pair of spaced apart brackets adjustably secured to said base, one of said brackets being adjacent the forward end of said base and the other of said brackets being at an intermediate point slightly forward of the intermediate guide tooth of said base, each bracket including a hinge cooperating means at its end, means for securing said brackets to said base with the hinge cooperating means at the guide teeth edge or at a selectively desired distance extending therefrom, a pair of opposed grooved blade guiding brackets, means for adjustably securing said grooved blade guiding brackets at a desired angle to said hinge cooperating means, and a lawn cutting blade guided between said opposed grooved guiding brackets.

2. A precision lawn edger for trimming a lawn edge at a desired precise angle to a sidewalk or other element adjacent the lawn edge comprising a base to be supported on the sidewalk or other element, a pair of spaced apart guide teeth extending downwardly from an edge of said base along the sidewalk edge, one of said teeth being at the rear end of said base and the other of said guide teeth being slightly forward of the midpoint of said edge of said base, a pair of spaced apart brackets adjustably secured to said base, one of said brackets being adjacent the forward end of said base and the other of said brackets being at an intermediate point slightly forward of the intermediate guide tooth of said base, each bracket including a hinge cooperating means at its end, means for securing said brackets to said base with the hinge cooperating means at the guide teeth edge or at selectively desired distances extending therefrom, a pair of opposed grooved blade guiding brackets, means for adjustably securing said grooved blade guiding brackets at a desired angle to said hinge cooperating means, a lawn cutting blade guided between said opposed grooved guiding brackets, and hammer impulse providing means for actuating or withdrawing said lawn cutting blade.

3. A precision lawn edger for trimming a lawn edge at a desired precise angle to a sidewalk or other element adjacent the lawn edge comprising a base to be supported on the sidewalk or other element, a pair of spaced apart guide teeth extending downwardly from an edge of said base along the sidewalk edge, one of said teeth being at the rear end of said base and the other of said guide teeth being slightly forward of the midpoint of said edge of said base, a pair of spaced apart brackets adjustably secured to said base, one of said brackets being adjacent the forward end of said base and the other of said brackets being at an intermediate point slightly forward of the intermediate guide tooth of said base, each bracket including a hinge cooperating means at its end, means for securing said brackets to said base with the hinge cooperating means at the guide teeth edge or at selectively desired distances extending therefrom, a pair of opposed grooved blade guiding brackets, means for adjustably securing said grooved blade guiding brackets at a desired angle to said hinge cooperating means, a lawn cutting blade guided between said opposed grooved guiding brackets, and hammer impulse providing means for actuating or withdrawing said lawn cutting blade including a handle mounted on said blade and anvil abutment means on said handle.

4. A precision lawn edger for trimming a lawn edge at a desired precise angle to a sidewalk or other element adjacent the lawn edge comprising a base to be supported on the sidewalk or other element, a pair of spaced apart guide teeth extending downwardly from an edge of said base along the sidewalk edge, one of said teeth being at the rear end of said base and the other of said guide teeth being slightly forward of the midpoint of said edge of said base, a pair of spaced apart brackets adjustably secured to said base, one of said brackets being adjacent the forward end of said base and the other of said brackets being at an intermediate point slightly forward of the intermediate guide tooth of said base, each bracket including a hinge cooperating means at its end, means for securing said brackets to said base with the hinge cooperating means at the guide teeth edge or at selectively desired distances extending therefrom, a pair of opposed grooved blade guiding brackets, means for adjustably securing said grooved blade guiding brackets at a desired angle to said hinge cooperating means, a lawn cutting blade guided between said opposed groove guiding brackets, and hammer impulse providing means for said lawn cutting blade comprising a handle mounted on said blade, an anvil abutment on the lower portion of said handle, and a freely movable sleeved hammer on said handle for manual reciprocation against said anvil abutment to operate said blade in lawn cutting action.

5. A precision lawn edger for trimming a lawn edge at a desired precise angle to a sidewalk or other element adjacent the lawn edge comprising a base to be supported on the sidewalk or other element, a pair of spaced apart guide teeth extending downwardly from an edge of said base along the sidewalk edge, one of said teeth being at the rear end of said base and the other of said guide teeth being slightly forward of the midpoint of said edge of said base, a pair of spaced apart brackets adjustably secured to said base, one of said brackets being adjacent the forward end of said base and the other of said brackets being at an intermediate point slightly forward of the intermediate guide tooth of said base, each bracket including a hinge cooperating means at its end, means for securing said brackets to said base with the hinge cooperating means at the guide teeth edge or at selectively desired distances extending therefrom, a pair of opposed grooved blade guiding brackets, means for adjustably securing said grooved blade guiding brackets at a desired angle to said hinge cooperating means, a lawn cutting blade guided between said opposed grooved guiding brackets, and hammer impulse providing means for said lawn cutting blade comprising a handle mounted on said blade, an anvil abutment on the lower portion of said handle, a sleeved hammer on said handle for manual reciprocation against said anvil abutment to operate said blade in lawn cutting action, and a second anvil abutment adjustably mounted on an upper portion of said handle for receiving hammer impulses in withdrawing said blade.

6. A precision lawn edger for trimming a lawn edge at a desired precise angle to a sidewalk or other element adjacent the lawn edge comprising a base to be supported on the sidewalk or other element, a pair of spaced apart guide teeth extending downwardly from an edge of said base along the sidewalk edge, one of said teeth being at the rear end of said base and the other of said guide teeth being slightly forward of the midpoint of said edge of said base, a pair of spaced apart brackets adjustably secured to said base, one of said brackets being adjacent the forward end of said base and the other of said brackets being at an intermediate point slightly forward of the intermediate guide tooth of said base, each bracket including a hinge cooperating means at its end, means for securing said brackets to said base with the hinge cooperating means at the guide teeth edge or at selectively desired distances extending therefrom, a pair of opposed grooved blade guiding brackets, means for adjustably securing said grooved blade guiding brackets at a desired angle to said hinge cooperating means, a lawn cutting blade guided between said opposed grooved guiding brackets, and hammer impulse providing means for said lawn cutting blade comprising a handle mounted on said blade, an anvil abutment on the lower portion of said handle, a sleeved hammer on said handle for manual reciprocation against said anvil abutments to operate said blade in lawn cutting action, a second anvil abutment adjustably mounted on an upper portion of said handle for receiving hammer impulses in withdrawing said blade, and a toe receiving handle on said base for advancing said base along the sidewalk edge intermediate successive cutting operations.

References Cited in the file of this patent
UNITED STATES PATENTS

| | | |
|---|---|---|
| 884,764 | Rood | Apr. 14, 1908 |
| 1,325,014 | Gilson | Dec. 16, 1919 |
| 1,343,269 | Lees | June 15, 1920 |
| 1,711,847 | Hermanson | May 7, 1929 |
| 2,033,227 | Brown | Mar. 10, 1936 |
| 2,052,154 | Wingard | Aug. 25, 1936 |
| 2,345,425 | Phillips | Mar. 28, 1944 |
| 2,419,719 | Kennedy | Apr. 29, 1947 |